United States Patent [19]

Citta et al.

[11] Patent Number: 4,467,353

[45] Date of Patent: Aug. 21, 1984

[54] TELEVISION SIGNAL SCRAMBLING SYSTEM AND METHOD

[75] Inventors: Richard W. Citta, Oak Park; Ronald B. Lee, Skokie, both of Ill.

[73] Assignee: Zenith Electronics Corporation, Glenview, Ill.

[21] Appl. No.: 361,329

[22] Filed: Mar. 25, 1982

[51] Int. Cl.³ .................. H04N 7/16; H04K 1/00
[52] U.S. Cl. .................. 358/120; 358/114; 358/124
[58] Field of Search ............. 358/114, 117, 118, 120, 358/124

[56] References Cited

U.S. PATENT DOCUMENTS

| | | | |
|---|---|---|---|
| 3,184,537 | 5/1965 | Court et al. | 178/5.1 |
| 3,440,338 | 4/1969 | Walker | 178/5.1 |
| 3,478,166 | 11/1969 | Reiter et al. | 178/5.1 |
| 3,530,232 | 9/1970 | Reiter et al. | 178/5.1 |
| 3,982,062 | 9/1976 | Simons | 178/5.1 |
| 3,996,418 | 12/1976 | Murphy et al. | 178/5.1 |
| 3,999,005 | 12/1976 | Dickinson | 358/114 |
| 4,002,825 | 1/1977 | Lewis | 325/32 |
| 4,034,402 | 7/1977 | Brian | 358/114 |
| 4,081,831 | 3/1978 | Tang et al. | 358/120 |
| 4,222,068 | 9/1980 | Thompson | 358/120 |
| 4,283,740 | 8/1981 | Okada | 358/120 |

Primary Examiner—S. C. Buczinski

[57] ABSTRACT

A system for encoding or scrambling a television signal and for subsequently decoding or unscrambling the signal for presentation on the viewing screen of a television receiver. Encoding is achieved by suppressing the amplitude and changing the phase of the television signal carrier during selected horizontal blanking intervals. Decoding is achieved by synchronously detecting the horizontal blanking intervals of a received signal having a suppressed amplitude and changed carrier phase and restoring the original relative characteristics of the television signal during the detected intervals.

21 Claims, 10 Drawing Figures

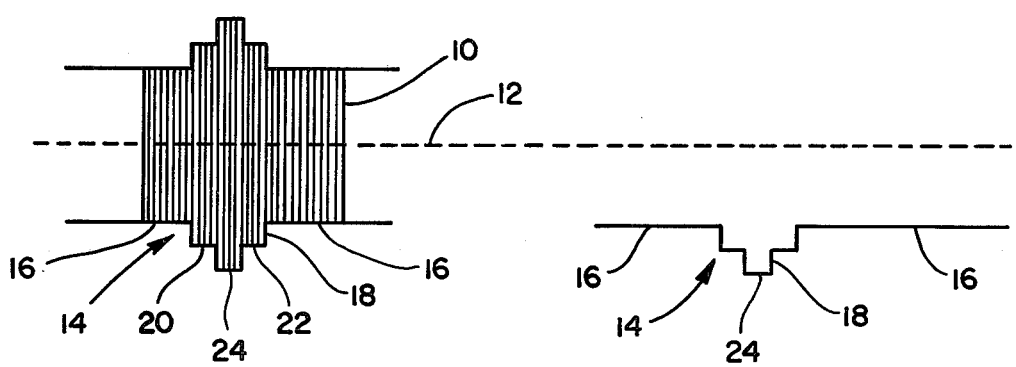
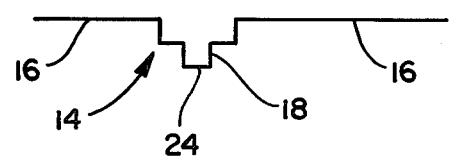
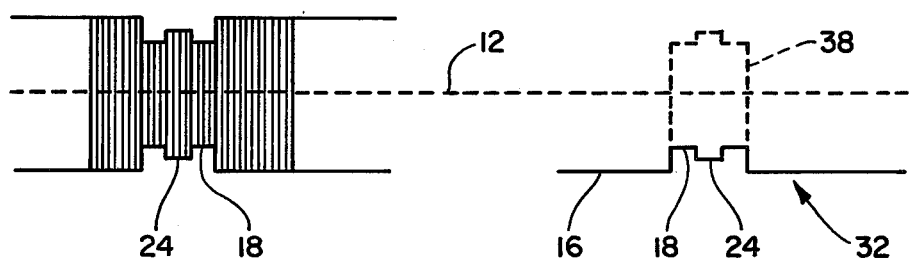
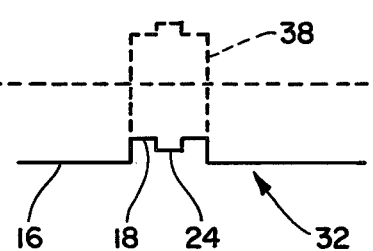
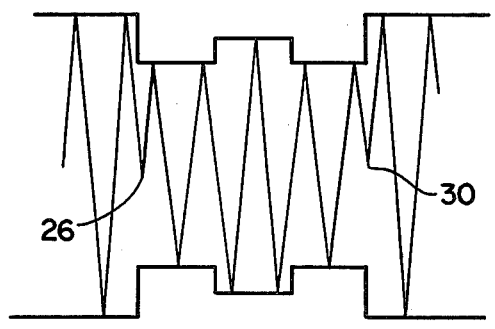
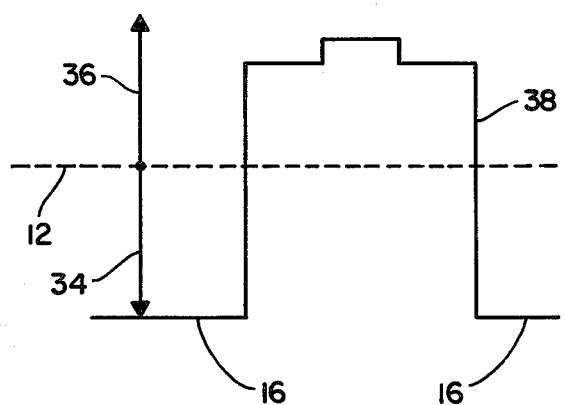

TELEVISION SIGNAL SCRAMBLING SYSTEM AND METHOD

BACKGROUND OF INVENTION

The present invention relates generally to television signal transmission and receiving systems and, more particularly, to a system wherein the horizontal synchronization components of a conventional NTSC television signal are suppressed providing a scrambled transmission format particularly useful in subscription or pay-television applications.

In subscription television systems programming signals are typically transmitted, either "over-the-air" or through a suitable cable network, in a scrambled form rendering the broadcast video information largely unviewable when received by a conventional television receiver. In order to unscramble the video display, each system subscriber is provided with a decoder operable for unscrambling the broadcast signals and for coupling the unscrambled signals to a conventional television receiver for viewing. Security is, of course, a prime consideration in the design of such systems. That is, the scrambling technique employed should be of a nature making the unauthorized decoding or unscrambling of the broadcasts difficult in order to deter the would-be pirate. At the same time, the scrambling technique must accommodate reliable decoding by authorized system subscribers.

One technique commonly used for scrambling the video display produced in response to a broadcast television signal is that of horizontal sync suppression. Suppression of the horizontal synchronization components of a broadcast television signal below most video levels will cause the deflection circuits of a normal television receiver to behave eratically such that a scrambled video image is produced on the display screen of the receiver. In addition, the ability of the television receiver to use the color reference burst associated with the horizontal synchronization signals is severely degraded thereby causing inaccurate color reproduction.

Exemplary prior art sync suppression systems are disclosed in U.S. Pat. Nos. 3,184,537 to Court et al; 3,478,166 to Reiter et al; 3,530,232 to Reiter et al and 4,222,068 to Thompson. In these prior art systems, the horizontal synchronization components of a broadcast television signal are typically suppressed or reduced to gray level and an additional keying or control signal is normally transmitted together with the television signal for controlling re-construction or regeneration of the proper horizontal sync levels at the receiver. For example, in U.S. Pat. No. 3,184,537 an audio sub-carrier is amplitude modulated with a suitable sync-insertion control signal. In other cases, horizontal sync re-construction at the receiver is effected by transmitting normal sync signals during the vertical interval of the television signal for enabling a timing circuit to lock to the horizontal components thereof. The timing circuit may then be used to accurately define the horizontal blanking intervals of the upcoming field to facilitate restoration of the horizontal synchronization signals in the composite baseband video signal.

It is a basic object of the present invention to provide an improved horizonal sync suppression system of the type especially useful in a subscription television system.

It is a more specific object of the invention to provide a horizontal sync suppression system for scrambling a broadcast television signal in a manner so as to deter the unauthorized decoding of the scrambled broadcast.

It is a further object of the invention to provide a horizontal sync suppression system for scrambling a broadcast television signal which does not require the transmission of additional control signals nor the use of complex timing circuits to effect restoration of proper synchronization signals at a television receiver.

It is yet another object of the invention to provide a horizontal sync suppression system for scrambling a broadcast television signal in which the decoding or unscrambling process is not necessarily accomplished at baseband.

BRIEF DESCRIPTION OF DRAWINGS

The features of this invention which are believed to be novel are set forth with particularity in the appended claims. The invention, together with it's objects and the advantages thereof, may be best understood by reference to the following description taken in conjunction with the accompanying drawings, in which like reference numerals identify like elements in the several figures and which;

FIGS. 1A–B illustrate waveform diagrams depicting a conventional television signal in the form of a carrier signal amplitude modulated by a composite baseband video signal and a detected representation thereof;

FIGS. 2A–2B illustrate waveform diagrams similar to those shown in FIGS. 1A–1B but modified to achieve a scrambled video image in accordance with the principles of the present invention;

FIGS. 3A–3B are enlarged representations of the waveform diagrams of FIGS. 2A–2B.

DESCRIPTION OF PREFERRED EMBODIMENTS

Figure 4:
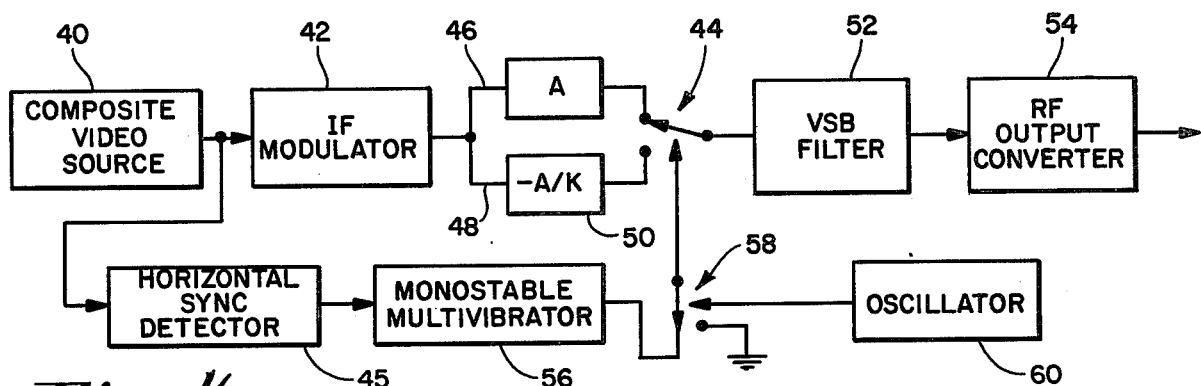
FIG. 4 is a block diagram illustrating a television signal transmitter including horizontal sync suppression apparatus embodying the principles of the present invention.

Referring now to the drawings, and in particular to FIGS. 1–3, there is shown a series of waveform diagrams which illustrate the principles underlying video scrambling and unscrambling in accordance with the present invention. In this regard, it will be understood that the video signal to be scrambled or encoded is broadcast as part of a standard television signal and distributed to viewers through a suitable transmission medium such as a coaxial cable in a CATV system, an "over-the-air" link or the like. Most often, although not necessarily, the broadcast signals will be provided to the viewers on a subscription basis wherein unscrambling or decode authorization is predicated upon monetary payments received from or promised by the viewer-subscribers. Thus, with relation to a particular television program, an authorized subscriber will be provided with an unscrambled video image for viewing while all unauthorized parties, whether system subscribers or not, will be provided with a television signal providing a scrambled video image which is largely unintelligible when displayed on a coventional television receiver viewing screen.

The method used to effect a scrambled video image in accordance with the present invention comprises a novel adaptation of the well known horizontal sync suppression technique. As previously discussed, suppression of the horizontal synchronization components of a broadcast television signal below most video levels will cause the deflection circuits of a normal television receiver to behave eratically such that a scrambled video image is produced on the display screen of a television receiver. In addition, the ability of the receiver to use the color reference burst associated with the horizontal synchronization signal is severely degraded thereby causing inaccurate color reproduction.

FIG. 1A illustrates a normal NTSC television signal comprising a carrier signal 10, having a substantially fixed phase characteristic and a zero carrier level 12, amplitude modulated by a composite baseband video signal 14. Composite baseband video signal 14 comprises a plurality of horizontal trace lines 16 defining the desired video image, the horizontal trace lines being separated by a plurality of horizontal blanking pulses 18. Each horizontal blanking pulse 18 includes a front porch 20 and a back porch 22 which typically carries on it a reference color burst signal (not shown). Each horizontal blanking pulse 18 further carries a horizontal synchronization pulse 24 following front porch 20 and preceding back porch 22. The horizontal synchronization pulses 24 are used to synchronize the horizontal deflection circuits of a television receiver to enable faithful reproduction of the broadcast video signals.

When received by a normal television receiver, television signal 10 is detected to reproduce composite baseband video signal 14 as illustrated by the waveform of FIG. 1B. This detection process is normally effected by a diode-type envelope detector or, alternatively, by a synchronous detector. A conventional envelope detector will, as it's name implies, detect the envelope which amplitude modulates the carrier signal 10, the polarity of the detected signal in relation to the zero carrier level 12 being determined by the polarity of the detecting diode in the receiver circuitry. As illustrated in FIG. 1B, detected composite baseband video signal 14 has a negative polarity with relation to the zero carrier level 12 with black level signals being more negative than white level signals. A conventional synchronous detector, on the other hand, uses the method of vectoral multiplication to derive a detected signal. By this method, the carrier signal 10, which may normally be represented by a vector having a predetermined angle, is multiplied by a reference signal which may also be represented by a vector having a predetermined angle. The polarity of the detected signal, e.g. composite baseband video signal 14 of FIG. 1B, is then determined by the relative angles of the vectors representing the transmitted carrier signal 10 and the reference signal.

FIG. 2A shows the television signal of FIG. 1A modified in accordance with the present invention to achieve a scrambled video image. In particular, the amplitude of the horizontal blanking pulse 18 and the horizontal synchronization pulse 24 carried thereby have been suppressed below most video levels and the phase characteristic of the carrier signal 10 has been changed during the interval defined by horizontal blanking pulse 18. Preferably, although by no means necessarily, this phase modulation of carrier signal 10 is effected such that the phase of the carrier signal is reversed during horizontal blanking pulse 18 relative to the phase of the carrier signal during horizontal trace intervals 16. The carrier phase reversal during the horizontal blanking interval is more clearly shown in the enlarged view of FIG. 3A which clearly shows a reversal in the carrier signal phase characteristic at points 26 and 30 occurring at the beginning and end of the horizontal blanking interval respectively. When the amplitude modulated carrier signal of FIGS. 2A and 3A is applied to a conventional diode detector, a detected signal such as represented by solid line waveform 32 of FIG. 2B will result. While detected waveform 32 of FIG. 2B represents a negative polarity composite baseband video signal, it will be appreciated that a positive polarity signal can likewise be produced by simply reversing the polarity of the detecting diode. In either event, it will be observed that the horizontal blanking pulse 18 as well as the horizontal synchronization pulse 24, of the detected signal 32 are below most video signal levels so that a scrambled video image will result when signal 32 is used to drive a television receiver. In addition, since the horizontal blanking and synchronization pulses 18 and 24 are buried within the normal range of video signals, recognition thereof to facilitate a restoration operation without the transmission of ancillary keying signals is extremly difficult.

Application of the amplitude and phase modulated carrier signal 10 of FIGS. 2A and 3A to a television receiver using a synchronous detector to develop a detected video signal also results in the production of a scrambled video image. In particular, the horizontal blanking and synchronization pulses 18 and 24 will be detected by the synchronous detector as "super-white" level pulses which are not suitable for properly synchronizing the horizontal deflection system of the television receiver.

In accordance with a primary aspect of the present invention, phase modulation detection techniques are used to control restoration of the horizontal blanking and synchronization pulses 18 and 24 to their proper relative levels in order to achieve an unscrambled video image on the viewing screen of a conventional television receiver. In a preferred embodiment of the invention, the requisite phase modulation detection is effected by using a synchronous detector in a rather unconventional mode to detect changes in the phase of the carrier signal. More specifically, it will be recalled that synchronous detection of the amplitude modulated carrier signal of FIGS. 2A and 3A is effected by a vector multiplication process whereby the carrier signal 10 is multiplied by a fixed phase reference signal. The modified carrier signal 10 of FIGS. 2A and 3A can be represented by two 180° out-of-phase vectors 34 and 36 (see FIG. 3B), vector 34 representing the carrier signal during the horizontal line intervals 16 and vector 36 representing the phase reversed carrier signal during the horizontal blanking intervals. Since the synchronous detection process effects a multiplication of vectors 34 and 36 with a fixed phase reference signal, the polarity of the detected video signal will exhibit a phase reversal during the horizontal blanking intervals such as illustrated by pulse 38 of FIGS. 2B and 3B. That is, during the horizontal line interval 16, the fixed phase reference signal is multiplied with vector 34 to produce a detected signal having a negative polarity with relation to zero carrier level 12, while during the horizontal blanking intervals, the fixed phase reference signal is multiplied with vector 36 to produce a detected signal having a positive polarity with relation to zero carrier level 12. Consequently, each horizontal blanking interval may be identified by detecting the "super-white" level pulse 38 produced by the synchronous detection process. The broadcast television signal may then be decoded or unscrambled by restoring, during the identified horizontal blanking intervals, the original phase and amplitude characteristics of the unmodified signal of FIG. 1A. The decoded signal may then be coupled to the antenna input terminals of a conventional television receiver to produce an unscrambled video image.

As referred to previously, it is not necessary to completely reverse the phase of carrier signal 10 during the horizontal blanking intervals 18 in order to practice the principles of the present invention. Thus, in general, the invention comprehends any change in the carrier signal phase during horizontal blanking intervals 18 which can be reliably detected by a phase modulation detector in order to restore the phase and amplitude characteristics of the signal to their proper relative values. The technique of complete, or nearly complete, carrier phase reversal and subsequent synchronous detection to identify the phase reversed carrier signal is one extremely convenient method for accomplishing these general principles.

FIG. 4 illustrates a circuit suitable for modifying or scrambling a broadcast television signal in accordance with the foregoing principles. A video source 40 supplies a conventional composite baseband video signal to the inputs of an IF modulator 42 and a horizontal synchronization detector 45. IF modulator 42 amplitude modulates an intermediate frequency carrier signal with the composite baseband video signal from video source 40 and couples the resulting amplitude modulated intermediate frequency signal to a switching device 44 via a first path 46 and a second parallel path 48. Path 46 is characterized by a gain of A, which may be unity, while parallel path 48 is characterized by a gain of $-A/K$ which is introduced by a suitable multiplication circuit 50. The ratio of the gain of path 48 to the gain of path 46, i.e. $-1/K$, is selected to suppress the amplitude of the intermediate frequency carrier signal coupled through path 48 below most video signal levels of composite baseband video signal 14 while simultaneously reversing its phase characteristic. Path 46, on the other hand, couples a conventional intermediate frequency signal to switching device 44. The output of switching device 44, which may comprise any component suitable for switching signals at the intermediate frequency, is supplied to a conventional vestigial side band filter 52 and therefrom to an RF output converter 54 which converts the intermediate frequency signal to a suitable RF signal for distribution to the viewer-subscribers.

Horizontal sync detector 45 is adapted for detecting the leading edge of each horizontal blanking pulse 18 of the composite baseband video signal 14 produced by video source 40 and for triggering a monostable multivibrator 56 in response thereto. Monostable multivibrator 56 is characterized by an unstable state having a time duration corresponding to one horizontal blanking interval. Therefore, multivibrator 56 will assume a first predetermined logic state, i.e. logic 1, in time coincidence with each horizontal blanking pulse 18 of the composite baseband video signal 14 produced by video source 40 and will otherwise assume the complimentary logic state, i.e. logic 0. The output of monostable multivibrator 56 is coupled through a second switching device 58 to the control input of switching device 44. Switching device 44 is responsive to a logic 1 input signal for coupling the output of IF modulator 42 to filter 52 via path 48 and for otherwise coupling the output of IF modulator 42 to filter 52 via path 46. It will therefore be appreciated, assuming that switch 58 is in it's closed position as shown in the drawings, that the output of IF modulator 42 is coupled to filter 52 via path 48 in time coincidence with each horizontal blanking pulse 18 of composite baseband video signal 14 and is otherwise coupled to filter 52 through path 46. Since path 48 is characterized by a $-1/K$ gain factor relative to path 46, the amplitude of the IF signal developed at the outut of switching device 44 will be suppressed and it's carrier phase characteristic will be reversed during each horizontal blanking interval. Thus, a scrambled output signal characterized by horizontal blanking intervals having suppressed amplitude levels and carrier phase reversals as shown in FIGS. 2A and 3A will be developed at the output of switching device 44. This scrambled signal is processed in a conventional manner by vestigial side band filter 52 and RF output converter 54 and then distributed to the viewer-subscribers.

Switching device 58 is controlled by an oscillator 60 which permits the foregoing scrambling process to be inhibited for periodic durations. This enhances image scrambling in a conventional television receiver which will periodically lock on and break lock from the synchronization signals thereby tearing the displayed image. In particular, oscillator 60 is operable for generating a pulse signal causing switch 58 to alternate between its closed position shown in the drawings and its open or grounded position. With switch 58 closed, the encoding or scrambling circuit operates to suppress the horziontal blanking and synchronization pulses 18 and 24 as previously described. However, when switch 58 is caused to assume its open or grounded position, a logic 0 signal is continously supplied to the control input of switch 44 causing it to couple the output of IF modulator 42 to its output via path 46 thereby inhibiting the scrambling process. In a preferred embodiment of the invention, oscillator 60 is operated at a rate of about 60 Hz for periodically inhibiting signal scrambling for 1.5-2.0 millisecond intervals. It should be appreciated that oscillator 60 may be replaced by any source of pulse signals for causing alterations between modified and nonmodified horizontal synchronization intervals to further tear the picture.

Figure 5:
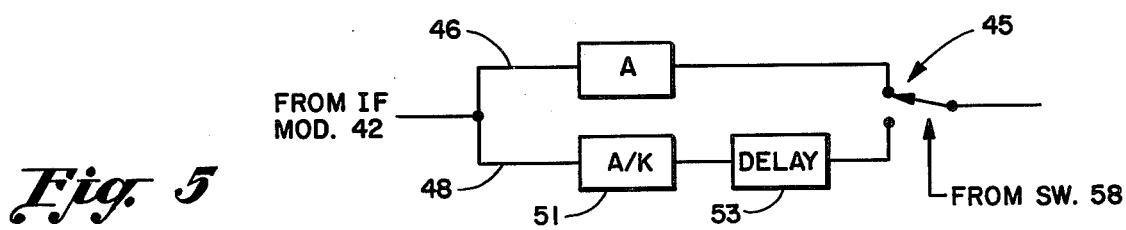
FIG. 5 is a block diagram of an alternate embodiment of the television signal transmitter of FIG. 1.

FIG. 5 illustrates an alternate embodiment of the transmitter of FIG. 4 for effecting the change in carrier signal phase during the horizontal blanking intervals of the video signal. In this embodiment, path 46 can be identical to that shown in FIG. 4 but path 48 is modified to include a multiplication circuit 51 having a gain of A/K and a serially connected delay circuit 53. Multiplication circuit 51 serves to suppress the amplitude of the horizontal blanking and synchronization pulses to a desired level while phase delay circuit 53 changes the phase of the carrier signal modulated by the horizontal pulses by introducing a selected delay into path 48. The amount of delay characterizing delay circuit 53 determines the amount of phase change experienced by the carrier signal during the horizontal blanking intervals. As mentioned previously, any detectable amount of phase change in the carrier signal is sufficient although, for purposes of convenience, a phase change of 180° (i.e.

a reversal of carrier signal phase) is preferred. A reversal of the carrier signal phase can be effected by the circuit of FIG. 4 by setting the delay characterizing delay circuit 53 at 180°.

Figure 6:
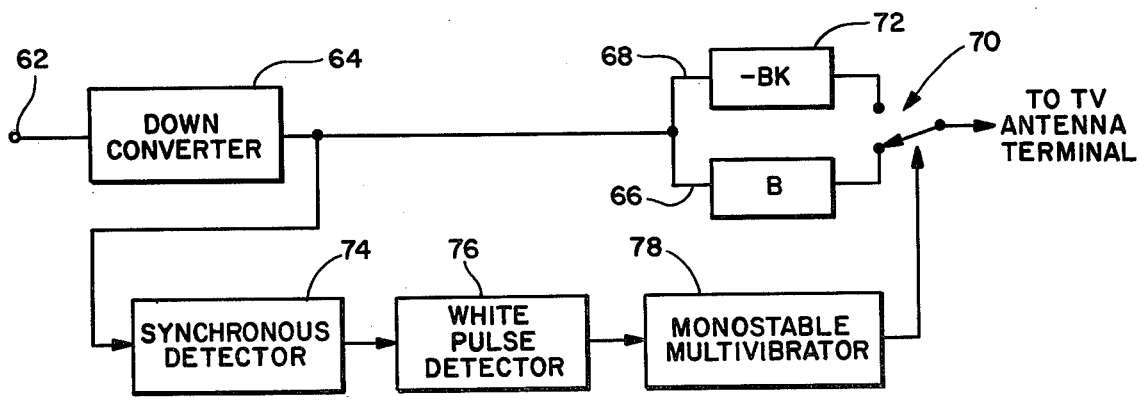
FIG. 6 is a block diagram illustrating a decoder or unscrambler operable for restoring the horizontal synchronization components of a television signal received from the transmitter of FIG. 1.

FIG. 6 illustrates a decoder adapted for unscrambling the television signals broadcast by the encoding transmitter of FIG. 4 or 5. It will be appreciated that each viewer-subscriber will be provided with such a decoder as an interface between the signal distribution system and the subscriber's television receiver for the purpose of restoring the horizontal blanking and synchronization pulses 18 and 24 to their nominal relative levels.

Referring in detail to FIG. 6, the RF signals broadcast over the signal distribution system are received at an input terminal 62 and down-converted in frequency by a down-converter 64. Down-converter 64 reduces the frequency of the received RF television signals to a frequency within the normal operating range of a conventional synchronous detector. Although down-converter 64 may be embodied in the form of a conventional television receiver tuner for converting the received RF television signals to corresponding intermediate frequency signals, it is preferred to provide a down-converted frequency corresponding to the carrier frequency of one of channels 2, 3, or 4. If the received television signal is down-converted to an intermediate frequency signal it will be appreciated that an additional up-conversion or re-modulation step must be performed to increase the frequency of the signal to a normal television channel carrier frequency before application to the antenna terminals of the television receiver. This re-modulation or up-conversion process, in addition to increasing the cost of the decoder, results in a displayed image of reduced quality. On the other hand, by down-converting the received television signal directly to a channel 2, 3, or 4 carrier frequency and, with some further signal processing to be explained below, the signal may be directly applied to the antenna terminals of a conventional television receiver for reproducing the broadcast video image without any additional re-conversion or re-modulation operations.

The down-converted television signal is coupled from down-converter 64 to a pair of parallel paths 66 and 68. Path 66, which is characterized by a gain of B, couples the down-converted television signal to an output switching device 70 while path 68 couples the down-converted television signal to switching device 70 through a multiplication circuit 72 characterized by a multiplication factor −BK. Switching device 70 is normally operated for coupling path 66 to its output except during those horizontal blanking intervals of the received television signal which have been modified (i.e. amplitude suppressed and carrier phase reversed) wherein path 68 is coupled to its output. As a consequence, all unmodified portions of the received television signal will be coupled to the television antenna terminals and experience a gain of B while the modified horizontal blanking and synchronization pulses will have been multiplied by a factor of −BK to restore the original relative amplitude and phase characteristics thereof. Gain factor B which is common to both paths 66 and 68 is selected to provide an appropriate signal level at the output of switching device 70 and to compensate for any signal loss in other circuits of the decoder. The signals applied to the television receiver therefore represents an unscrambled or decoded form of the broadcast signal adapted for producing a video image corresponding to the baseband video signal developed by video source 40 of the transmitter of FIG. 4.

Figure 7:
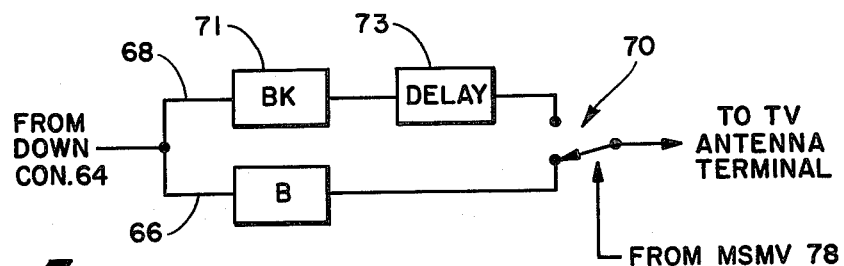
FIG. 7 is a block diagram of an alternate embodiment of the decoder of FIG. 6.

Alternatively, signal paths 66 and 68 may take the form illustrated in FIG. 7. In this case, which is analagous to the encoder embodiment of FIG. 5, multiplication circuit 72 is replaced with a multiplication circuit 71 having a gain of BK and a delay circuit 73. The delay characterizing delay circuit 73 is selected to restore the phase of the encoded carrier signal to its original relative value. Therefore, for example, if the phase of the carrier signal had been reversed during the horizontal blanking intervals of the transmitted signal, the delay characterizing delay circuit 73 would be set at 180° to restore the original phase characteristic of the carrier signal.

Returning to FIG. 6, control of switching device 70 is effected by coupling the output of down-converter 64 to the input of a phase modulation detector which preferably comprises a synchronous detector 74. Synchronous detector 74, in the manner previously described, develops a "super-white" output pulse, e.g. pulse 38 in FIGS. 2B and 3B, in response to each horizontal blanking interval of the received television signal which was amplitude suppressed and carrier phase reversed by the encoder of FIG. 4. This "super-white" pulse is detected by a white pulse detector 76, which may comprise a conventional level detector, for triggering a monostable multivibrator 78. In response to the triggering signal, monostable multivibrator 78 develops an output control signal for an interval corresponding to a horizontal blanking interval thereby causing switching device 70 to move form its normal position coupling path 66 to its output to its other position coupling path 68 to its output. As a result, during each modified horizontal blanking interval, switching device 70 is operated for connecting path 68 to its output for coupling restored horizontal and blanking synchronization pulses and is otherwise operated for connecting path 66 to its output for coupling unmodified portions of the received television signal. As a result, a standard television signal having restored horizontal blanking and synchronization pulses is coupled to the antenna terminals of the television receiver for producing a normal video image represented by the transmitted baseband video signal.

While a particular embodiment of the invention has been shown and described, it will be obvious to those skilled in the art that changes and modifications may be made without departing from the invention in its broader aspects. Therefore, the aim in the appended claims is to cover all such changes and modifications as fall within the true spirit and scope of the invention.

I claim:
1. A television signal transmission system comprising:
  means for developing and transmitting an encoded television signal having a suppressed amplitude and a first carrier signal phase characteristic during selected horizontal blanking intervals and having an unsuppressed amplitude and a second carrier signal phase characteristic different from said first phase characteristic during all video scan lines and other horizontal blanking intervals;
  means for receiving said encoded television signal;
  phase modulation detection means responsive to said received television signal for detecting said selected horizontal blanking intervals; and
  means responsive to said detection means and to said received television signal for developing a decoded television signal having an unsuppressed amplitude and a constant carrier signal phase characteristic.

2. A television signal transmission system according to claim 1 wherein the difference between said first and second carrier signal phase characteristics is selected for enabling said phase modulation detection means for producing a super-white level signal for detecting said selected horizontal blanking intervals.

3. A television signal transmission system according to claim 2 wherein the difference between said first and second carrier signal phase characteristics is 180° and wherein said phase modulation detection means comprises a synchronous detector.

4. A television signal transmission system comprising:
means for developing an encoded television signal having a suppressed amplitude and a first carrier signal phase characteristic during selected horizontal blanking intervals and having an unsuppressed amplitude and a second carrier signal phase characteristic substantially 180 degrees different from said first phase characteristic during all video scan lines and other horizontal blanking intervals;
means for transmitting said encoded television signal;
means for receiving said transmitted television signal;
phase modulation detection means for developing a detection signal having a first polarity during said selected horizontal blanking intervals and otherwise having a second polarity opposite of said first polarity; and
means responsive to the first and second polarities of said detection signal and to said received television signal for developing a decoded television signal having an unsuppressed amplitude and a constant carrier signal phase characteristic.

5. A television signal transmission system according to claim 4 wherein said phase modulation detection means comprises synchronous detector means.

6. A television signal transmission system according to claim 5 wherein said means for developing an encoded television signal comprises:
means for developing a standard television signal comprising a composite baseband video signal amplitude modulating a carrier signal having a substantially fixed phase characteristic;
means comprising first and second parallel signal paths each receiving said television signal, the ratio of the gain of said first signal path to the gain of said second signal path being represented by a factor $-K$;
an output terminal; and
switching means for coupling said second signal path to said output terminal during said selected horizontal blanking intervals and otherwise coupling said first signal path to said output terminal.

7. A television signal transmission system according to claim 6 including means responsive to said standard television signal for developing a control signal identifying each horizontal blanking interval thereof and means selectively coupling said control signal to said switching means, said switching means being responsive to said control signal for coupling said second signal path to said output terminal and otherwise coupling said first signal path to said output terminal.

8. A television signal transmission system according to claim 6 wherein said second signal path comprises a multiplication circuit characterized by a negative multiplication factor.

9. A television signal transmission system according to claim 6 wherein said second signal path comprises a multiplication circuit and a delay circuit connected in series therewith, said delay circuit being characterized by a delay of substantially 180°.

10. A television signal transmission system according to claim 5 wherein said means for developing a decoded television signal comprises:
means comprising third and fourth parallel signal paths each responsive to said received television signal, the ratio of the gain of said third signal path to the gain of said fourth signal path being represented by the factor $-K$;
an output terminal; and
switching means responsive to said synchronous detector means for coupling said third signal path to said output terminal in response to the first polarity of said detection signal and coupling said fourth signal path to said output terminal in response to the second polarity of said detection signal, whereby said decoded television signal is developed at said output terminal.

11. A television signal transmission system according to claim 10 wherein said third signal path comprises a multiplication circuit characterized by a negative multiplication factor.

12. A television signal transmission system according to claim 10 wherein said third signal path comprises a multiplication circuit and a delay circuit connected in series therewith, said delay circuit being characterized by a delay of substantially 180°.

13. A television signal transmission method comprising:
developing an encoded television signal having a suppressed amplitude and a first carrier signal phase characteristic during selected horizontal blanking intervals and having an unsuppressed amplitude and a second carrier signal phase characteristic different from said first phase characteristic during all video scan lines and other horizontal blanking intervals;
transmitting said encoded television signal;
receiving said transmitted signal;
detecting said selected horizontal blanking intervals; and
developing a decoded television signal by restoring the amplitude of said received television signal to an unsuppressed form during said detected horizontal blanking intervals and causing said received television signal to exhibit a constant carrier signal phase characteristic.

14. A method according to claim 13 wherein said detecting steps comprises synchronously detecting said selected horizontal blanking intervals.

15. A television signal transmission method comprising:
developing an encoded television signal having a suppressed amplitude and a first carrier signal phase characteristic during selected horizontal blanking intervals and having an unsuppressed amplitude and a second carrier signal phase characteristic different from said first phase characteristic during all video scan lines and other horizontal blanking intervals;
transmitting said encoded television signal;
receiving said transmitted signal;
synchronously detecting said received signal for developing a detection signal having a first polarity except during said selected horizontal blanking intervals when said detection signal is characterized by a polarity opposite of said first polarity; and developing a decoded television signal by restoring the amplitude of said received television signal to an unsuppressed form in response to the opposite polarity of said detection signal and causing said received television signal to exhibit a constant carrier signal phase characteristic.

16. A receiver for decoding an encoded television signal having a suppressed amplitude and a first carrier signal phase characteristic during selected horizontal blanking intervals and having an unsuppressed amplitude and a second carrier signal phase characteristic different from said first phase characteristic during all video scan lines and other horizontal blanking intervals, comprising:

means for receiving said encoded television signal;

phase modulation detection means responsive to said received television signal for detecting said selected horizontal blanking intervals; and means responsive to said detection means and to said received television signal for developing a decoded television signal having an unsuppressed amplitude and a constant carrier signal phase characteristic.

17. A receiver according to claim 16 wherein said phase modulation detection means comprises a synchronous detector.

18. A receiver for decoding an encoded television signal having a suppressed amplitude and a first carrier signal phase characteristic during selected horizontal blanking intervals and having an unsuppressed amplitude and a second carrier signal phase characteristic different from said first phase characteristic during all video scan lines and other horizontal blanking intervals, comprising:

means for receiving said encoded television signal;

synchronous detection means detecting said received signal for developing a detection signal having a first polarity except during said selected horizontal blanking intervals when said detection signal is characterized by a second polarity opposite of said first polarity; and means responsive to the first and second polarities of said detection signal and to said received television signal for developing a decoded television signal having an unsuppressed amplitude and a constant carrier signal phase characteristic.

19. A receiver according to claim 18 wherein said first and second carrier signal phase characteristics differ by substantially 180° and wherein said means for developing a decoded television signal comprises:

means comprising third and fourth parallel signal paths each responsive to said received television signal, the ratio of the gain of said third signal path to the gain of said fourth signal path being represented by a factor $-K$;

an output terminal; and switching means responsive to said synchronous detector means for coupling said third signal path to said output terminal in response to the first polarity of said detection signal and coupling said fourth signal path to said output terminal in response to the second polarity of said detection signal, whereby said decoded television signal is developed at said output terminal.

20. A receiver according to claim 19 wherein said third signal path comprises a multiplication circuit characterized by a negative multiplication factor.

21. A receiver according to claim 19 wherein said third signal path comprises a multiplication circuit and a delay circuit connected in series therewith, said delay circuit being characterized by a del

* * * * *

UNITED STATES PATENT AND TRADEMARK OFFICE
CERTIFICATE OF CORRECTION

PATENT NO. : 4,467,353

DATED : August 21, 1984

INVENTOR(S) : Richard W. Citta and Ronald B. Lee

It is certified that error appears in the above-identified patent and that said Letters Patent is hereby corrected as shown below:

In claim 21, line 4, delete "del" and substitute therefor --delay of substantially $180°$.--

Signed and Sealed this

Tenth Day of December 1985

[SEAL]

Attest:

Attesting Officer

DONALD J. QUIGG

Commissioner of Patents and Trademarks